(12) United States Patent
Martinez et al.

(10) Patent No.: US 7,581,039 B2
(45) Date of Patent: Aug. 25, 2009

(54) PROCEDURE AND DEVICE FOR PROGRAMMING A DMA CONTROLLER IN WHICH A TRANSLATED PHYSICAL ADDRESS IS STORED IN A BUFFER REGISTER OF THE ADDRESS PROCESSING UNIT AND THEN APPLIED TO THE DATA BUS AND STORED IN A REGISTER OF THE DMA CONTROLLER

(75) Inventors: Albert Martinez, Bouc Bel Air (FR); Jean Nicolai, Chateauneuf le Rouge (FR)

(73) Assignee: STMicroelectronics SA, Montrouge (FR)

( * ) Notice: Subject to any disclaimer, the term of this patent is extended or adjusted under 35 U.S.C. 154(b) by 186 days.

(21) Appl. No.: 11/179,033

(22) Filed: Jul. 11, 2005

(65) Prior Publication Data

US 2006/0020719 A1    Jan. 26, 2006

(30) Foreign Application Priority Data

Jul. 12, 2004    (FR) .................................... 04 07763

(51) Int. Cl.
    *G06F 13/28* (2006.01)
(52) U.S. Cl. .......................................... 710/22; 710/26
(58) Field of Classification Search ..................... 710/26
    See application file for complete search history.

(56) References Cited

U.S. PATENT DOCUMENTS 4,849,875 A    7/1989    Fairman et al.
5,659,798 A *  8/1997    Blumrich et al. ............... 710/26
5,887,190 A    3/1999    Priem et al.
5,890,220 A    3/1999    Mochida et al.
7,120,708 B2 * 10/2006   Futral et al. .................... 710/26

FOREIGN PATENT DOCUMENTS

EP    0447 145    9/1991

OTHER PUBLICATIONS

Evangelos P. Markatos et al., "User-Level DMA Without Operating System Kernel Modification", IEEE, 1997, pp. 322-330.

(Continued)

*Primary Examiner*—Henry W. H. Tsai
*Assistant Examiner*—Kris Rhu
(74) *Attorney, Agent, or Firm*—Lisa K. Jorgenson; Stephen Bongini; Fleit Gibbons Gutman Bongini & Bianco P.L.

(57) ABSTRACT

A method for programming a DMA controller of a system on a chip that includes a CPU, an MMU, and a DMA controller including source, destination, and size registers associated with a base subaddress. In response to a first instruction of a user program that includes a virtual address, the virtual address is translated into a corresponding physical address, and the physical address is stored in a buffer register that is inaccessible to the user program. In response to a second instruction of the user program, the physical address stored in the buffer register is applied to the data bus and a first word including high-order bits indicating the base subaddress is applied to the address bus. The source or destination register is selected according to the first word applied to the address bus and the physical address applied to the data bus is stored in the selected register.

23 Claims, 2 Drawing Sheets

| INSTRUCTIONS | ADDRESS BUS BA | DATA BUS BD |
|---|---|---|
| seq 1 { $T_1$: "translate(VA_SRC; t)" | PA_DMA_BASE ASID$_p$ / $M_{size1}$ | t |
| $S_1$: "storeDMA VA_SRC" | PA_DMA_BASE ASID$_p$ / $M_{SRC}$ | PA_SRC |
| $L_1$: "LoadDMA VA_SRC" | PA_DMA_BASE ASID$_p$ / $M_{stat1}$ | STATUS |
| seq 2 { $T_2$: "translate(VA_DEST; t)" | PA_DMA_BASE ASID$_p$ / $M_{size2}$ | t |
| $S_2$: "STOREDMA VA_DEST" | PA_DMA_BASE ASID$_p$ / $M_{DEST}$ | PA_DEST |
| $L_2$: "LoadDMA VA_DEST" | PA_DMA_BASE ASID$_p$ / $M_{stat2}$ | STATUS |

OTHER PUBLICATIONS

French Preliminary Search Report dated Jan. 25, 2005 for French Application No. 04 06666.

French Preliminary Search Report dated Feb. 21, 2005 for French Application No. 04 07763.

* cited by examiner

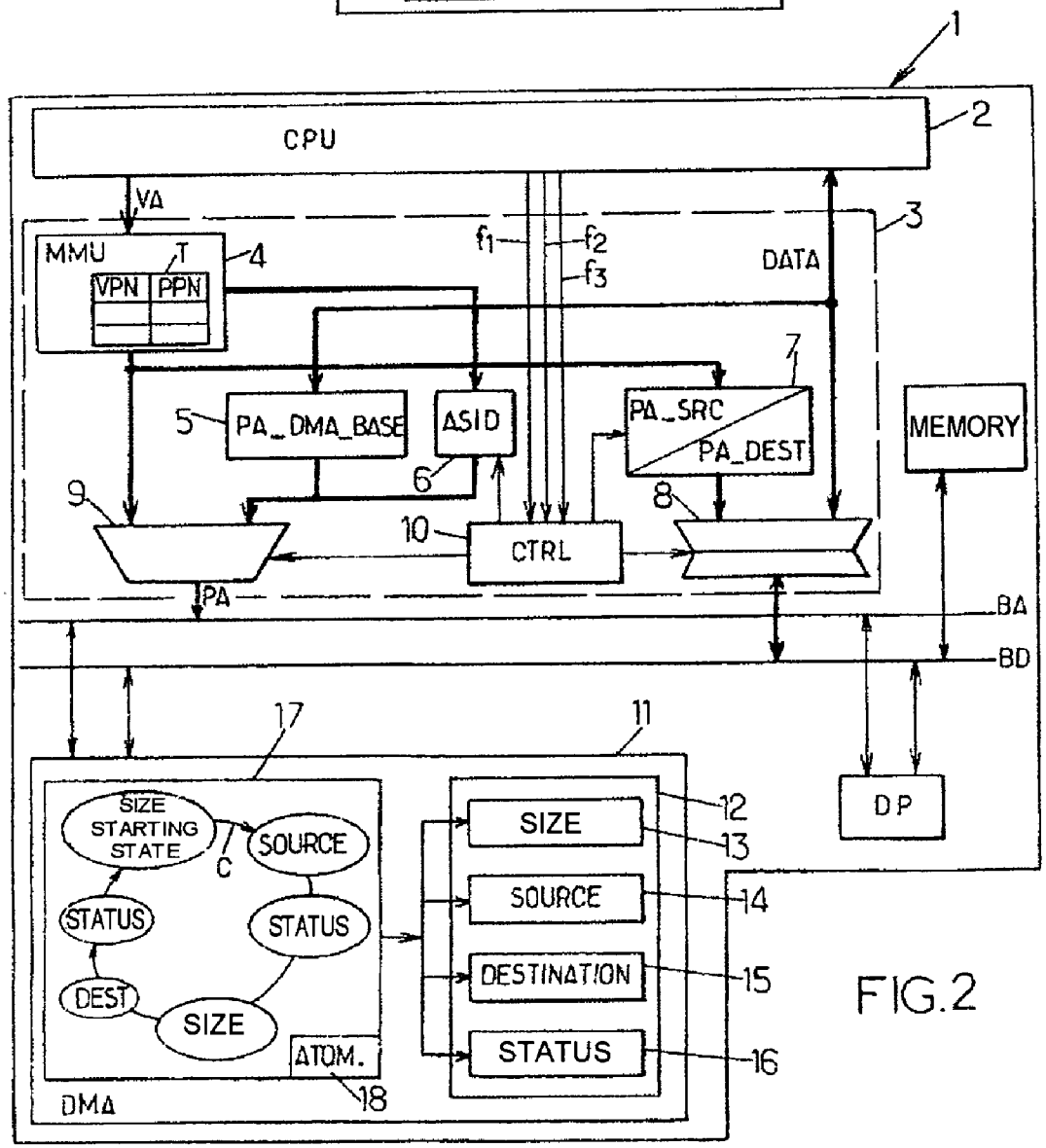

| INSTRUCTIONS | ADDRESS BUS BA | DATA BUS BD |
|---|---|---|
| $T_1$: "translate(VA_SRC;t)" | PA_DMA_BASE \| $ASID_p$ — $M_{size1}$ | t |
| $S_1$: "StoreDMA VA_SRC" | PA_DMA_BASE \| $ASID_p$ — $M_{SRC}$ | PA_SRC |
| $L_1$: "LoadDMA VA_SRC" | PA_DMA_BASE \| $ASID_p$ — $M_{stat1}$ | STATUS |
| $T_2$: "translate(VA_DEST;t)" | PA_DMA_BASE \| $ASID_p$ — $M_{size2}$ | t |
| $S_2$: "STOREDMA VA_DEST" | PA_DMA_BASE \| $ASID_p$ — $M_{DEST}$ | PA_DEST |
| $L_2$: "LoadDMA VA_DEST" | PA_DMA_BASE \| $ASID_p$ — $M_{stat2}$ | STATUS | seq1: $T_1, S_1, L_1$
seq2: $T_2, S_2, L_2$

FIG. 3

PROCEDURE AND DEVICE FOR PROGRAMMING A DMA CONTROLLER IN WHICH A TRANSLATED PHYSICAL ADDRESS IS STORED IN A BUFFER REGISTER OF THE ADDRESS PROCESSING UNIT AND THEN APPLIED TO THE DATA BUS AND STORED IN A REGISTER OF THE DMA CONTROLLER

CROSS-REFERENCE TO RELATED APPLICATIONS

This application is based upon and claims priority from prior French Patent Application No. 04 07763, filed Jul. 12, 2004, the entire disclosure of which is herein incorporated by reference.

FIELD OF THE INVENTION

The present invention relates to silicon integrated systems or SoC (System on a Chip), and more specifically to the programming of the DMA controller of an SoC.

BACKGROUND OF THE INVENTION

A silicon integrated system or System on a Chip (SoC) includes at least a central processing unit (CPU) on which programs can be run, a direct memory access controller (DMA controller), a memory and a memory management unit. Such SoCs are typically included in electronic devices such as general purpose computers, decoder units or "Set-Top-Boxes", personal digital assistants or PDAs, mobile phones, etc.

In physical memory, a variable size memory space is dynamically allocated to each application program or user program. More specifically, each user program has access to only some of the pages of physical memory. These pages form a memory space (which may be discontinuous) which is addressed at memory bus level by physical addresses, but which is known to the user program via an address space (normally continuous) called a virtual address space which the program accesses with virtual addresses. The virtual address space is specific to the user program. The relationship that links the virtual addresses in the address space and the physical addresses in physical memory is stored in the form of a translation table, called a page table, which is managed by the operating system and stored in main memory. The latest address translations computed by the MMU table reloading unit are stored in a specific cache memory called a TLB (Translation Look-aside Buffer).

Each entry of the TLB, that is each line corresponding to a translation in the TLB, comprises an address space identifier (ASID) to distinguish identical virtual addresses in different address spaces. Each ASID is linked, on a one-to-one basis, to a predefined address space of the system.

The DMA controller performs data transfers between the internal memory of the SoC and peripheral memory devices (for example, disks) based on information supplied to it. This information comprises the source physical address of the transfer, the destination physical address of the transfer and the size of the memory area to be transferred.

Conventionally, a program requesting programming of the DMA controller for a DMA transfer running on the SoC in user mode (also called application mode or non-privileged mode) supplies a virtual address, which is the virtual address of the source of the DMA transfer or the destination of the DMA transfer, to the operating system or OS. The OS, running in privileged mode (also called supervisor mode or kernel mode) then takes control, translates the supplied virtual address into a corresponding physical address. It requires in turn storage of the source physical address of the transfer obtained in the source register, storage of the destination address in the destination register and storage of the size in the size register, and this from the virtual address of the registers. The OS then supervises the transfer performed by the DMA controller based on the information stored in its registers and notifies the program initiating the request of the result of the transfer.

The store instructions normally used are of the type: "STORE pa_src@dma_src_reg_adr", "STORE pa_dest@dma_dest_reg_adr" and "STORE size@dma_size_reg_adr", in which "pa_src" is the source physical address, "pa_dest" is the destination physical address, "size" is the size of the memory area transferred, "dma_src_reg_adr", "dma_dest_reg_adr" and "dma_size_reg_adr" are respectively the virtual addresses of the source, destination and size registers. The first instruction above in plain language means "store the data corresponding to the source physical address "pa_src" in the source address register of the DMA controller whose virtual address is "dma_src_reg_adr"". This instruction therefore supplies a virtual address argument "dma_src_reg_adr" and a data argument "pa_src" to be stored at the address supplied as an address argument.

With reference to FIG. 1 which shows an example of a conventional SoC, the conventional programming path for the DMA controller is as follows: the virtual address "dma_src_reg_adr" is supplied by the CPU to the MMU over the virtual address bus VA. The MMU translates it into a physical address, checks the rights of access to this physical address, then applies it to the physical address bus PA, via which it is made available in particular to the DMA controller on the general bus A which is linked to a set of entities comprising, for example, disk controllers, physical memory, etc.

In parallel, the source physical address "pa_src" is applied by the CPU to the data bus DAT, from which it is made available on the general data bus D, also linked to the set of entities.

The source address and the address of the source register are respectively applied to the general data bus D and to the general address bus A according to the protocol adopted for bus management. According to the bus management protocols, the physical address of the source register is applied, for example, to the general address bus A virtually at the same time as the source physical address "pa_src" is applied to the general data bus D, or the address of the source register is positioned on the general address bus A one clock pulse before the source physical address is positioned on the general data bus D (for a protocol in which the addresses are positioned one clock pulse before the corresponding data), or even one of the addresses is applied on the rising edge whereas the other is applied on the falling edge, and so on.

The translation is performed by the MMU using a translation table.

A number of attempts have recently been made to program the DMA controller directly by a program running in user mode, instead of by the OS. This stems in particular from the very high proportion of time required for the programming of a DMA controller by the OS, compared to the data transfer time itself that is achieved by the DMA controller.

One of the difficulties encountered originates from the fact that the registers of the DMA controller must be programmed with physical addresses, whereas the programs in user mode do not have access to them and it is not desirable, particularly for security reasons, for them to have access to them.

Solutions are proposed in the documents "User-Level DMA without Operating System Kernel Modification", by Evangelos P. Markatos and Manolis G. H. Katevenis (Institute of Computer Science, Science and Technology Park of Crete, 1997 IEEE), "Protected User-Level DMA for the Shrimp Network Interface", by M. A. Blumrich et al. (Proc of the 2$^{nd}$ International Symposium on High Performance Computer Architecture, pages 154-165, February 1996) and "Integration of Message Passing and Shared Memory in the Stanford Flash Multi-Processor", by J. Heinlein et al. (Proc. of the 6th International Conference on Architectural Support for Programming Languages and Operating Systems, pages 38-50, 1994).

According to these solutions, the user program executes an already existing store instruction of the "STORE" type of instruction described above, but places as the address argument the source or destination virtual address that it wants to program in the DMA controller, and not the address of the register of the DMA controller to be programmed. The effect of this is to force the MMU to translate the source or destination virtual address supplied into a corresponding physical address. This technique also enables the MMU to check that the user program does indeed have the right to access this address.

Two additional difficulties had to be taken into account. First of all, it is essential to ensure that the DMA controller receives this physical address which is located on the address bus A, and writes it as data into its source or destination register. Moreover, it is also essential to allow the memory area to which the physical address applied to the bus corresponds, to disregard the STORE instruction because this instruction is not addressed to it.

The above-mentioned document provides a solution to these problems. This solution consists in setting to 1 the most significant bit (MSB) of the source or destination address of a DMA transfer before it is supplied to the MMU. Thus, the DMA controller receives, using its appropriate state machine, as data to be stored in one of its registers, any word including an MSB at 1.

This solution therefore performs implicit addressing (or shadow addressing), based on the "STORE" instruction and the prefix 1.

The drawback of this technique is that the system must not include any memory area or peripheral device with an address beginning with 1, which halves the addressable memory space that is actually available. Thus, for a 32-bit (or 4 GB) system, the addressable memory space in practice is reduced by half, to $2^{31}$ bits (or 2 GB), which is very detrimental.

SUMMARY OF THE INVENTION

It is an object of the present invention to overcome this drawback.

A first embodiment of the present invention provides a method for programming a DMA controller in a system on a chip that includes a central processing unit, a memory management unit for translating a virtual address word according to a predefined translation table, and a DMA controller that is coupled to an address bus and a data bus. The DMA controller includes at least one set of registers associated with a base subaddress, with each set comprising a source register, a destination register and a size register. According to the method, under the control of the central processing unit, in response to a first predefined dedicated instruction of a user program that includes an address argument indicating a virtual address, the memory management unit translates the virtual address into a corresponding physical address, and the corresponding physical address is stored in a buffer register which cannot be accessed by the user program. In response to a second predefined dedicated instruction of the user program, the physical address stored in the buffer register is applied to the data bus and a first word including high-order bits indicating the base subaddress is applied to the address bus. The DMA controller selects the source register or the destination register according to the first word applied to the address bus in response to the second instruction, and stores the physical address applied to the data bus in the selected register.

A second embodiment of the present invention provides a system on a chip that includes a DMA controller coupled to an address bus and a data bus. The DMA controller includes at least one set of registers associated with a base subaddress, with each set including a source register, a destination register and a size register. The system on a chip furthermore includes an address processing block comprising a memory management unit for translating a virtual address word into a physical address word according to a predefined translation table, a buffer register that is inaccessible to the user program, and a set register for storing the base subaddress of the DMA controller. A central processing unit, in response to a first predefined instruction dedicated to DMA controller programming, and in response to a second predefined instruction dedicated to DMA controller programming, supplies a virtual address from that instruction to the memory management unit. The address processing block furthermore stores in the buffer register the physical address resulting from the translation by the memory management unit of the virtual address according to the translation table. The address processing block, in response to receiving the second instruction, forms a first word including at least high-order bits indicating the base subaddress stored in the set register, and applies the first word to the address bus. The address processing block, in response to receiving the second instruction, applies a first word formed following the receipt of the second instruction to the address bus, and applies to the data bus the physical address stored in the buffer register. The DMA controller selects the source register or the destination register according to the first word applied to the address bus in response to the second instruction, and stores the physical address applied to the data bus in the selected register.

Other objects, features, and advantages of the present invention will become apparent from the following detailed description. It should be understood, however, that the detailed description and specific examples, while indicating preferred embodiments of the present invention, are given by way of illustration only and various modifications may naturally be performed without deviating from the present invention.

BRIEF DESCRIPTION OF THE DRAWINGS

FIG. 1 is a representation of a conventional system on a chip;

FIG. 2 represents a system on a chip according to an embodiment of the present invention; and FIG. 3 represents the various elements applied to the data bus and the address bus to program a DMA controller in an embodiment of the present invention.

DETAILED DESCRIPTION OF PREFERRED EMBODIMENTS

Preferred embodiments of the present invention will be described in detail hereinbelow with reference to the attached drawings.

FIG. 2 shows a system on a chip (SoC) according to an embodiment of the present invention. In this embodiment, the system on a chip 1 has a standard N-bit architecture, in which a virtual address is presented in the form of a number forming a virtual address encoded on these N bits.

The architecture considered subsequently is a 32-bit architecture such that a virtual address is presented in the form of a number forming a page address or VPN (Virtual Page Number) encoded on the 20 high-order bits, followed by an offset in the page encoded on the 12 low order bits. The present invention can, however, be implemented with any type of architecture.

The system on a chip 1 represented in FIG. 2 comprises a central processing unit or CPU 2, on which user programs are run.

The system on a chip 1 also comprises an address processing block 3. The address processing block 3 comprises an MMU 4, a set register 5, an identifier register 6, a buffer register 7, a multiplexer/demultiplexer 8, a multiplexer 9 and a control block 10.

The system on a chip 1 also comprises a DMA controller 11, which includes a set 12 of registers required to perform the programming of the DMA transfer. This set 12 of registers comprises a size register 13, a source register 14, a destination register 15 and a status register 16. The size, source and destination registers 13, 14, and 15 are designed to store programming data respectively comprising the size, the source address and the destination address of the DMA transfer to be performed. The status register 16 is designed to store the status of the programming operations aimed at storing this programming data in the corresponding registers 13, 14, and 15. The DMA controller 11 also includes a state machine 17 that is designed to select a register from the set 12 and store programming data in it. The state machine 17 also includes an atomicity register 18.

A general address bus BA interconnects the address processing block 3, the DMA controller 11, the CPU 2, peripheral devices DP, a RAM memory, etc. Similarly, a data bus BD interconnects these various entities.

The set 12 of registers of the DMA controller 11 is associated with a physical base subaddress PA_DMA_BASE, which is a page address, encoded on 20 bits. The various registers 13 to 16 of the set 12 are addressed by adding a respective offset in this page, encoded on the 12 low-order bits.

In the description that follows, hexadecimal notation is used for the address values. Also, the symbols "0x" preceding a number in hexadecimal notation mean that this number is an address value.

For example, in one embodiment the base subaddress PA_DMA_BASE is equal to 0xF0000. The address of the size register 13 is 0xF0000330, the address of the source register 14 is 0xF0000334, the address of the destination register 15 is 0xF0000338 and the address of the status register 16 is 0xF000033C.

The base subaddress PA_DMA_BASE of the set 12 is written in the set register 5 when the system on a chip 1 is initialized by the operating system.

The state machine 17 of the DMA controller 11 operates as follows: when it detects the presence of the base subaddress PA_DMA_BASE in the high-order bits of a word M placed on the address bus BA, it selects a predefined register from the registers of the set 12. If it is one of the source, destination or size registers 14, 15, or 13, it stores in the selected register the data then appearing on the data bus BD. If it is the status register 16, it applies the content of the register 16 to the data bus BD.

The register to be selected is determined according to the current state of the state machine 17 according to an ordered cycle C of states. The cycle comprises successive states relating to the size (starting point), the source, the status, the size, the destination, then the status, before returning to the starting point. When the state machine 17 is at the start of a DMA controller programming cycle, it is ready to select the size register 13, that is, it points to the address 0xF0000330 of the size register 13. Then, once the size register 13 has been selected, it increments its pointer and then points to the address 0xF0000334 of the source register 14 and is then ready to select the source register 14. Then, once the source register 14 has been selected, it moves its pointer which then points to the address 0xF000033C of the status register 16 and is then ready to select the status register 16. Then, once the status register 16 has been selected, the state machine 17 again moves its pointer and points once again to the address 0xF0000330 of the size register 13. Then, once the size register 13 has been selected, it moves its pointer and then points to the address 0xF0000338 of the destination register 15. It is then ready to select the destination register 15. Then, once the destination register 15 has been selected, it moves its pointer so as to point to the address 0xF000033C of the status register 16. It is then ready to select the status register 16. Finally, once the status register 16 has been selected, it again points to the address 0xF0000330 of the size register 13, and is again ready to program the registers 13, 14, and 15 of the set 12 for a new DMA transfer. Other exemplary embodiments of the state machine and the DMA controller are described below.

In the embodiment which will now be described with reference to FIG. 2, the state machine 17 is designed to capture, before actually selecting the register whose address it is pointing to, in a word M applied to the address bus BA and including in high-order bits the subaddress PA_DMA_BASE, the 8 bits following the subaddress.

If the state machine 17 is in the starting state, these 8 bits are stored in the atomicity register 18. Since the state machine 17 is then pointing to the size register 13, it selects the size register 13 and stores in it the data then applied to the data bus BD. Then, depending on whether the storage in the size register 13 has been successful or not, the state machine 17 completes a field, dedicated to the status relating to the size programming operation, in the status register 16 with a code indicating a success or a failure.

If the state machine 17 points to the size register 13 outside the starting state, the source register 14 or the destination register 15, the 8 bits extracted from the word M applied to the bus BA are compared to those present in the atomicity register 18.

If they do not match, the register pointed to is not selected and the data placed on the data bus BD is not stored. Also the state machine 17 completes a predefined field in the status register 16 which is dedicated to the status of the source or destination programming operations, according to the register pointed to, with a code indicating a failure.

If they match, the register pointed to is selected and the storage is performed. Then, depending on whether it is completed successfully or not, the status register 16 is updated with a corresponding code indicating a success or a failure.

If the state machine 17 points to the status register 16, the 8 bits extracted from the word M applied to the address bus BA are compared to those present in the atomicity register 18. If they do not match, the state machine 17 completes the status register 16 with a code indicating a failure.

Then, independently of whether or not there is a match between the 8 bits extracted from the word M applied to the address bus BA and those present in the atomicity register 18, the state machine 17 applies the content of the status register 16 to the data bus BD. This content on the bus BD is used to report to the CPU 2 on the latest programming operations carried out.

In a conventional manner, the MMU 4 translates a 32-bit virtual address supplied to it as input, by translating only the higher order bits indicating the page (in this case the first 20 bits). Thus, it translates the VPN into a physical page number or PPN, using a predefined table T, which defines a virtual address space specific to each user program using an ASID. The MMU 4 also checks that the user program initiating the translation does indeed have the appropriate rights to access the memory area addressed by the virtual address supplied as input.

The MMU 4 is linked with the buffer register 7, with the identifier register 6 and with the multiplexer 9, which is also linked with the set register 5 and the identifier register 6.

A virtual address bus VA links the CPU 2 to the MMU 4. A data bus DATA links the CPU 2 to the set register 5 and to the multiplexer/demultiplexer 8, which is also linked to the buffer register 7.

Three wires f1, f2, and f3 also link the CPU 2 and the control block 10, and can be set to a high level or a low level by the CPU 2.

The control device 10 is linked to the set register 5, to the identifier register 6, to the buffer register 7 and to the multiplexers 8 and 9. It controls these multiplexers and these registers, according to the state of the wires f1, f2, and f3, to form, from the elements supplied as input to the multiplexers, output elements, which are applied to the address bus BA for the multiplexer 9 and which are applied to the data bus BD for the multiplexer/demultiplexer 8, according to the operation described below.

A user program P is run on the CPU 2 to perform a programming operation on the DMA controller 11 using a 32-bit source virtual address VA_SRC, a 32-bit destination virtual address VA_DEST and a size t of the memory area to be transferred.

It thus comprises two successive sequences Seq1 and Seq2 of three instructions which are executed in turn.

Each sequence Seq1 or Seq2 comprises the following instructions, with respective arguments:

the "Translate" instruction ("T" instruction), the format of which is "Translate (argVA; argD)" where "argVA" is a virtual address argument and "argD" is a data argument, is used to translate the virtual address supplied as an address argument into a corresponding physical address and to store this physical address in the buffer register 7;

the "StoreDMA" instruction ("S" instruction), the format of which is "StoreDMA argVA" where "argVA" is a virtual address argument, is used to apply the physical address stored in the buffer register 7 to the data bus BD; and the "LoadDMA" instruction ("L" instruction), the format of which is "LoadDMA argVA" where "argVA" is a virtual address argument, is used to provide the status of the programming operation performed.

The first sequence Seq1 comprises:
"Translate" (VA_SRC; t)" (instruction "T1"), then:
"StoreDMA VA_SRC" (instruction "S1"), and:
"LoadDMA VA_SRC" (instruction "L1").

The second sequence Seq2 comprises:
"Translate" (VA_DEST; t)" (instruction "T2"), then:
"StoreDMA VA_DEST" (instruction "S2"), and finally:
"LoadDMA VA_DEST" (instruction "L2").

The CPU 2 is designed, when the instruction T1 is executed by a user program, to place the virtual address argument supplied (in this case, VA_SRC) on the bus VA, place the data argument supplied (in this case, t) on the data bus DATA and set the wire f1 to the high level.

The MMU 4 translates the virtual address argument supplied VA_SRC into a physical address PA_SRC according to the table T, which also defines the $ASID_P$ specific to the user program P. The MMU 4 supplies the physical address PA_SRC to the buffer register 7 for storage. It also supplies the $ASID_P$ identifying the user program P from which the instruction T1 originates, to the identifier register 6 for storage. In the example described here, the ASIDs are encoded on 8 bits.

Then, a word $M_{size1}$ including high-order bits equal to the base subaddress PA_DMA_BASE stored in the set register 5, followed by bits encoding the identifier $ASID_P$ supplied by the MMU 4 following the translation of VA_SRC, is formed and supplied as input to the multiplexer 9.

The control block 10 is designed, in response to the setting of the wire f1 to the high state, to control the multiplexer/demultiplexer 8 so that the data t on the data bus DATA is applied to the data bus BD. It is also designed to control the multiplexer 9 so that the word $M_{size1}$ is applied to the address bus BA.

These applications on the buses BA and BD are performed under the control of the control block 10 at respective moments linked to each other (for example, virtually simultaneously, or one occurring one clock pulse before the other, etc.) and according to the bus management protocol adopted. They are represented in FIG. 3, which is a table in which each line corresponds to a DMA controller programming instruction executed on the CPU 2 according to the progress of the sequence Seq1, then of the sequence Seq2 ("instructions" column), and to the elements applied to the address bus BA ("address bus BA" column) and to the data bus BD ("data bus BD" column) following the execution of the instruction by the CPU 2 in this embodiment of the present invention.

The state machine 17 of the DMA controller 11 is initially in its DMA transfer programming starting state and therefore points to the size register 13. When it detects the subaddress PA_DMA_BASE in the high-order bits of the word $M_{size1}$ applied to the address bus BA, it extracts the eight bits following the subaddress, which encode the $ASID_P$ and stores them in the atomicity register 18. Then it selects the size register 13 and stores in it the size t which is then applied to the data bus BD. It then completes the status register 16 with the code indicating the success or the failure of the storage operation thus carried out and moves its pointer to point to the source register 14 according to the cycle C of the state machine 17.

When the instruction S1 "StoreDMA VA_SRC" is executed by the user program P, the CPU 2 places the virtual address argument supplied (in this case, VA_SRC) on the bus VA and sets the wire f2 to the high state.

The MMU 4 translates the virtual address argument supplied VA_SRC into a physical address PA_SRC according to the table T, which also contains the $ASID_P$ specific to the user program P. The MMU 4 thus supplies the $ASID_P$ which identifies the user program P from which the instruction S1 originates. This identifier is then compared to the identifier stored in the identifier register 6, which was determined from the first instruction T1 received by the CPU 2.

If they match, a word $M_{SRC}$ including high-order bits equal to the subaddress PA_DMA_BASE stored in the set register 5, followed by bits encoding the identifier $ASID_P$ supplied by the MMU following the translation of VA_SRC performed after receipt of the instruction S1, is formed and supplied as input to the multiplexer 9.

Moreover, if they match, the content of the buffer register 7 storing the source physical address PA_SRC stored when the instruction T1 was processed by the address instruction processing block 3 is supplied to the multiplexer/demultiplexer 8.

Also, the multiplexer/demultiplexer 8, or the multiplexer 9, is controlled by the control block 10 to enable the application to the data bus BD, of the physical address PA_SRC originating from the buffer register 7, or the application of the word $M_{SRC}$ to the address bus BA, according to the line relating to the instruction S1 in FIG. 3.

The state machine 17 of the DMA controller 11 then points to the source register 14. When it detects the subaddress PA_DMA_BASE in the high-order bits of the word $M_{SRC}$ applied to the address bus BA, it extracts the eight bits following the base subaddress and corresponding to the identifier $ASID_P$, and compares them to the identifier stored in the atomicity register 18.

If they are different, it writes a failure code into the status register 16 relating to the current source address storage operation.

If the identifiers match, it selects the source register 14 and stores in it the data PA_SRC applied to the data bus BD. Then it completes the status register 16 with the code indicating the success or the failure of the duly completed storage operation and then increments its pointer so as to point to the status register 16 according to the cycle C of the state machine 17.

When the next instruction L1 ("LoadDMA VA_SRC") is executed by the user program P, the CPU 2 places the virtual address argument supplied (in this case, VA_SRC) on the bus VA and sets the wire f3 to the high level.

The MMU 4 translates the virtual address argument supplied VA_SRC into a physical address PA_SRC according to the table T, and supplies the $ASID_P$ which defines the user program P from which the instruction L1 originates. This identifier is compared to the identifier stored in the identifier register 6, which was determined from the first instruction T1 received by the CPU 2.

If they match, a word $M_{stat1}$ is formed and supplied as input to the multiplexer 9. It includes high-order bits equal to the subaddress PA_DMA_BASE stored in the set register 5, followed by bits encoding the identifier $ASID_P$ which was supplied by the MMU following the translation of the address VA_SRC performed in response to the instruction L1.

Also, the multiplexer 9 is controlled by the control block 10 to allow the word $M_{stat1}$ to be applied to the address bus BA, according to the line relating to the instruction L1 in FIG. 3.

Similarly, the demultiplexer 8 is controlled by the control block to allow passage from the data bus BD to the data bus DATA so that the CPU 2 can read the status sent by the DMA controller.

The state machine 17 of the DMA controller 11 then points to the status register 16. When it detects the subaddress PA_DMA_BASE in the high-order bits of the word $M_{stat1}$ applied to the address bus BA, it extracts the eight bits following the base subaddress and corresponding to the identifier $ASID_P$ and compares them to the identifier stored in the atomicity register 18.

If they are different, it writes a failure code into the status register 16 relating to the operation to supply the status.

Then, whether the identifiers match or not, it selects the status register 16 and applies its content to the data bus BD. It then moves its pointer so as to point to the size register 13, according to the cycle C of the state machine 17.

The processing of the first sequence Seq1 for programming the DMA controller 11 is thus completed. The second sequence Seq2 is then executed.

When the instruction T2 ("Translate (VA_DEST; t)") is executed by the user program P, the CPU 2 places the virtual address argument supplied (in this case, VA_DEST) on the bus VA, places the data argument supplied (in this case, size t) on the bus DATA and sets the wire f1 to the high level.

The MMU 4 translates the virtual address argument supplied VA_DEST into a physical address PA_DEST according to the table T, which also defines the $ASID_P$ specific to the user program P. The MMU 4 supplies the physical address PA_DEST to the buffer register 7 for storage. It also supplies the $ASID_P$, which identifies the user program P from which the instruction T2 originates, to the identifier register 6 for storage.

Then, a word $M_{size2}$, including high-order bits equal to the subaddress PA_DMA_BASE stored in the set register 5, followed by bits encoding the identifier $ASID_P$ supplied by the MMU following the translation of VA_DEST, is formed and supplied as input to the multiplexer 9.

In response to the setting of the wire f1 to the high state, the control block 10 is designed to control the multiplexer/demultiplexer 8 so that the data t on the data bus DATA is applied to the data bus BD, and to control the multiplexer 9 so that the word $M_{size2}$ is applied to the address bus BA, as shown in FIG. 3.

The state machine 17 of the DMA controller 11 then points to the size register 13, according to the cycle C. When it detects the subaddress PA_DMA_BASE in the high-order bits of the word $M_{size2}$ applied to the address bus BA, it extracts the eight bits following the base subaddress and corresponding to the identifier $ASID_P$, and compares them to the identifier stored in the atomicity register 18.

If they are different, it writes a failure code into the status register 16 for the transfer size programming operation.

If they match, it selects the size register 13 and stores the size t, which is on the data bus BD. Then it completes the status register 16 with the code indicating the success or the failure of the duly completed programming operation.

The state machine 17 then increments its pointer so as to point to the destination register 15 according to the cycle C.

When the instruction S2 ("StoreDMA VA_DEST") is executed by the user program P, the CPU 2 places the virtual address argument supplied (in this case, VA_DEST) on the bus VA and sets the wire f2 to the high level.

The MMU 4 translates the virtual address argument supplied VA_DEST into a physical address PA_DEST according to the table T, which also defines the $ASID_P$ specific to the user program P. The MMU 4 supplies the $ASID_P$ which identifies the user program P from which the instruction S2 originates. The $ASID_P$ is then compared to the identifier stored in the identifier register 6 which was determined from the instruction T2 received by the CPU 2.

If they match, a word $M_{DEST}$, including high-order bits equal to the base subaddress PA_DMA_BASE stored in the set register 5, followed by bits encoding the identifier $ASID_P$ supplied by the MMU following the translation of VA_DEST in response to the instruction S2, is formed and supplied as input to the multiplexer 9.

Moreover, if the identifiers match, the content of the buffer register 7 storing the source physical address PA_DEST is supplied to the multiplexer/demultiplexer 8.

Also, as in the first sequence Seq1, the multiplexer/demultiplexer 8, or the multiplexer 9, is controlled by the control block 10 to allow the physical address PA_DEST originating from the buffer register 7 to be applied to the data bus BD, or the word $M_{DEST}$ to be applied to the address bus BA, according to the line relating to the instruction S2 in FIG. 3.

The state machine 17 of the DMA controller 11 then points to the destination register 15. When it detects the subaddress PA_DMA_BASE in the high-order bits of the word $M_{DEST}$ applied to the address bus BA, it extracts the eight bits following the base subaddress and corresponding to the identifier $ASID_P$ and compares them to the identifier stored in the atomicity register 18.

If they are different, it writes a failure code into the status register 16 relating to the current destination address programming operation.

If the identifiers match, it selects the destination register 15 and stores in it the data VA_DEST then applied to the data bus BD. Then it completes the status register 16 with the code indicating the success or the failure of the destination address programming operation carried out and then increments its pointer so as to point to the status register 16 according to the cycle C of the state machine 17.

When the next instruction L2 ("LoadDMA VA_DEST") is executed by the user program P, the CPU 2 places the virtual address argument supplied (in this case VA_DEST) on the bus VA and sets the wire f3 to the high level.

The MMU 4 translates the virtual address supplied VA_DEST into a physical address PA_DEST according to the table T, which defines the $ASID_P$ specific to the user program P. The MMU 4 supplies the $ASID_P$ which identifies the user program P from which the instruction L2 originates, which is then compared to the identifier stored in the identifier register 6 which was determined from the instruction T1 executed first by the CPU 2.

If they match, a word $M_{stat2}$, including high-order bits equal to the base subaddress PA_DMA_BASE stored in the set register 5, followed by bits encoding the identifier $ASID_P$ supplied by the MMU following the translation of VA_DEST in response to the instruction L2, is formed and supplied as input to the multiplexer 9.

Then, the word $M_{stat2}$ is applied to the address bus BA, as indicated in the line relating to the instruction L2 in FIG. 3.

Similarly, the demultiplexer 8 is controlled by the control block to allow passage from the data bus BD to the data bus DATA so that the CPU 2 can read the status sent by the DMA controller.

The state machine 17 of the DMA controller 11 then points to the status register 16. When it detects the subaddress PA_DMA_BASE in the high-order bits of the word $M_{stat2}$ applied to the address bus BA, it extracts the eight bits following the base subaddress and corresponding to the identifier $ASID_P$ and compares them to the identifier stored in the atomicity register 18.

If they are different, it writes a failure code into the status register 16 relating to the operation to supply the status.

Then, whether the identifiers match or not, it selects the status register 16 and applies its content to the data bus BD and then increments its pointer so as to point to the size register 13 according to the cycle C of the state machine 17. It then returns to the starting state of the cycle C.

The processing of the sequence Seq2 for programming the DMA controller 11 is thus completed.

The DMA controller is now programmed with the source, size and destination data it needs to perform the DMA transfer.

By introducing two new instructions (T and S) and modifying a standard MMU by adding to it the additional modules described for the processing block, the present invention can be used to program the DMA controller without presenting the drawback of wasting a lot of addressable memory space, as in the conventional solutions described above. The third instruction (L) is used to check that the programming operations have been completed correctly.

Furthermore, the present invention can be used for the processing of the virtual addresses supplied to the MMU for translation, which does not concern programming of the DMA controller (when the wires f1, f2 and f3 are all at the low level).

In the embodiment described above, the size can in fact be supplied by the user program only in the instruction T2 of the second sequence Seq2.

The words $M_{size1}$, $M_{SRC}$, $M_{stat1}$, $M_{size2}$, $M_{DEST}$ and $M_{stat2}$ comprise 28 bits in the case described (20 bits for encoding the base subaddress and 8 bits for encoding the ASID). Since the architecture is 32-bit, the remaining bits can be used in other embodiments of the present invention to transmit additional information.

For example, in another embodiment, the address processing block is designed, when the programming instruction received is the "translate" instruction (wire f1 at the high level), to insert after the identifier, in the word then to be applied to the address bus BA ($M_{size1}$ or $M_{size2}$), a code $X_T$ indicating the size register. If, as in the example described above, the architecture is 32-bit with the ASID encoded on 8 bits and the VPN on 20 bits, the code $X_T$ is encoded on 4 bits at most. In one embodiment, a code $X_{ST}$ is also inserted by the address processing block on receipt of a "LoadDMA" instruction (wire f3 at the high level) in the word then to be applied to the address bus BA ($M_{stat1}$ or $M_{stat2}$)

The DMA controller is then designed to extract the code from a word applied to the address bus BA and including the subaddress PA_DMA_BASE, the ASID and a code, and to deduce from it the register to be selected from the size and status registers. Since the size and status registers can thus be designated explicitly in a word placed on the address bus, the cycle of the state machine is then invoked only in the case where the word applied to the bus BA and including the base subaddress in the high-order bits does not include a code. The cycle, in the case where a code has been defined for the size register and for the status register, then has only two states: a starting "source" state and a "destination" state. The cycle has three states if only one code (for example, for the size register) has been defined.

In another embodiment, the state machine, for example the one cited above with a two-state cycle (a starting state which is a source state and a destination state), is integrated in the address processing block (so it is not then included in the DMA controller). The state is modified according to the cycle as and when a "StoreDMA" instruction is received (wire f2 at the high level). In this case, the code $X_T$, or $X_{ST}$, is on the one hand inserted in the words ($M_{size1}$, $M_{size2}$, or $M_{stat1}$, $M_{stat2}$) applied to the address bus when the wire f1, or f3, is at the high level. And when the wire f2 is at the high level, if the current state of the cycle is the "destination" state, the address processing block selects a code $X_D$ and if the current state of the cycle is the "source" state, it selects a code $X_S$. Then, the selected code is inserted after the base subaddress and the ASID in the word to be applied to the address bus BA ($M_{SRC}$ if the state is a source state and $M_{DEST}$ if it is a destination state). In this embodiment, the DMA controller is designed to determine the register to be selected from the registers of the set, according to the code $X_S$, $X_D$, $X_T$ or $X_{ST}$ in the word applied to the address bus BA.

The use of the identifiers, in this case the ASID relating to the user program P which generated the instruction, enables the atomicity of the instructions which follow each other to be checked, both at address processing block level and at DMA controller 11 level. This arrangement enables the insertion of an instruction originating from a user program P' other than the user program P to be identified and the information required for the DMA transfer not to be mixed. This reinforces the security of the system against fraudulent attempts to access the external memory via DMA accesses. When the DMA controller is a multi-channel DMA controller, that is, it is designed to complete in parallel a number of sets of registers of the type of the set 12, the identifier can also be used to select the size register, the source register, the destination register or the status register, from the set concerning the program P. If the ASID sent does not correspond to the ASID stored in the atomicity register of one of the sets, an error status is output.

In another embodiment, the identifiers (the ASIDs in the case described with reference to the figures) of the user programs performing a DMA controller programming operation can be disregarded in the state machine. In one embodiment, they can also be disregarded in the address processing block. In this case, there is no need for the identifier registers 6 and 18, or to transmit the identifier in the word applied to the address bus BA. Other arrangements are then made to overcome problems of non-atomicity of the DMA controller programming instructions. In one embodiment, the address processing block then forms words to be applied to the address bus BA with the complete physical addresses of the registers (and no longer then only the base subaddress). There again, a two-state state machine is used in the address processing block to ascertain whether the address to be placed on the address bus BA on receipt of an instruction S is the source register address or the destination register address. In an embodiment not taking into account the identifier, only the first instruction T of each sequence needs to have a virtual address argument.

In another embodiment, the instruction to ascertain the status of the programming can be used only once after applying two sequences of "Translate" and "StoreDMA" instructions, relating on the one hand to the source address and to the size, and on the other hand to the destination address.

In another embodiment, the size argument can be supplied only in the second sequence Seq2 and not in the sequence Seq1. All of the embodiments described above allow the user program P programming the DMA controller to not have access to the addresses of the DMA controller registers, which provides protection against memory access violations.

However, in other embodiments, the virtual address of the source register, or destination register, is supplied as an address argument of the "StoreDMA" instruction (in place of the source and destination virtual addresses of the DMA transfer). It is translated by the MMU into a physical address. The word applied to the address bus ($M_{SRC}$, $M_{DEST}$) then comprises the physical address of the source register, or of the destination register.

Similarly, in this embodiment, the "LoadDMA" instruction includes, as an address argument, the virtual address of the status register, which is translated into a physical address by the MMU. Also the word ($M_{stat1}$, $M_{stat2}$) applied to the address bus corresponds to the physical address of the status register. In this embodiment, the address processing block is designed, on receipt of the "Translate" instruction (wire f1 at the high level), to form the word to be applied to the address bus with the physical address of the size register.

In this case, the atomicity is not checked using identifiers defined on the basis of the address arguments of the instructions. And each register of the DMA controller is addressed explicitly by the words placed on the address bus BA. There is then no need for a state machine.

While there has been illustrated and described what are presently considered to be the preferred embodiments of the present invention, it will be understood by those skilled in the art that various other modifications may be made, and equivalents may be substituted, without departing from the true scope of the present invention. Additionally, many modifications may be made to adapt a particular situation to the teachings of the present invention without departing from the central inventive concept described herein. Furthermore, an embodiment of the present invention may not include all of the features described above. Therefore, it is intended that the present invention not be limited to the particular embodiments disclosed, but that the invention include all embodiments falling within the scope of the appended claims.

What is claimed is:

1. A method for a user program running in user mode to directly program a DMA controller of a system on a chip, the system on a chip including a central processing unit, a memory management unit for translating virtual addresses according to a translation table, an address bus, a data bus, an address processing unit coupled between the central processing unit and the address and data buses, and the DMA controller, the DMA controller including at least one set of registers having a base subaddress that is used to address registers of the set of registers, the registers of the set of registers including a source register, a destination register, and a size register, said method comprising the steps of:

in response to a first dedicated instruction of the user program that includes an address argument indicating a virtual address corresponding to the physical address to be stored in the source or destination register of the DMA controller, translating the virtual address into the corresponding physical address and storing the corresponding physical address in a buffer register of the address processing unit that cannot be accessed by the user program; and in response to a second dedicated instruction of the user program that includes an address argument indicating the virtual address corresponding to the physical address to be stored in the source or destination register of the DMA controller:

applying the corresponding physical address stored in the buffer register of the address processing unit to the data bus and a first word that includes at least high-order bits indicating the base subaddress of the set of registers to the address bus; and in response to the first word being applied to the address bus, selecting the source or destination register of the DMA controller and storing the corresponding physical address applied to the data bus in the selected register of the DMA controller, wherein the first dedicated instruction and the second dedicated instruction are instructions dedicated to directly programming the DMA controller, and the second dedicated instruction is different than and after the first dedicated instruction.

2. The method according to claim 1, wherein each of the registers of the set of registers of the DMA controller has a physical address encoded on a number N of bits made up of the high-order bits indicating the base subaddress of the set of registers followed by bits defining an offset in the set.

3. The method according to claim 1, wherein the first dedicated instruction also includes a data argument indicating a size, and the method further comprises the steps of:

in response to the first dedicated instruction, applying the data argument to the data bus and a second word including the high-order bits indicating the base subaddress of the set of registers to the address bus; and selecting the size register as a function of the second word applied to the address bus in response to the first dedicated instruction, and storing the data argument applied to the data bus in the size register.

4. The method according to claim 1,
wherein the set of registers of the DMA controller also includes at least one status register, and
the method further comprises the steps of:
in response to a third dedicated instruction of the user program, applying at least a third word including the high-order bits indicating the base subaddress of the set of registers to the address bus; and
selecting the status register in response to the third word being applied to the address bus, and applying content of the status register to the data bus.

5. The method according to claim 4, further comprising the steps of:
in response to the first dedicated instruction, determining a first identifier of the user program and storing the first identifier in an identifier register of the address processing unit;
in response to at least one of the second and third dedicated instructions, determining a second identifier of the user program, and comparing the second identifier to the first identifier stored in the identifier register of the address processing unit;
if the determination was in response to the second dedicated instruction, applying the physical address stored in the buffer register of the address processing unit to the data bus and the first word to the address bus only if the first and second identifiers match; and
if the determination was in response to the third dedicated instruction, applying the third word to the address bus only if the first and second identifiers match.

6. The method according to claim 5, wherein each of the identifiers of the user program is an address space identifier which is stored in the translation table of the memory management unit for each user program of the system on a chip, and which is delivered by the memory management unit when translating a virtual address that is supplied as an address argument of an instruction.

7. The method according to claim 5,
wherein at least one word from the first word and the third word applied to the address bus also includes the first or second identifier of the user program, and
one of the registers of the DMA controller is selected as a function of the first or second identifier in the one word that is applied to the address bus.

8. The method according to claim 1, wherein the DMA controller further includes a state machine for, when the first word is applied to the address bus, selecting the source or destination register of the DMA controller as a function of a current state of the state machine in an ordered cycle.

9. A system on a chip comprising:
an address bus;
a data bus;
a DMA controller coupled to the address bus and the data bus, the DMA controller including at least one set of registers having a base subaddress that is used to address registers of the set of registers, the registers of the set of registers including a source register, a destination register, and a size register;
an address processing block comprising:
a memory management unit including a translation look-aside buffer comprising a translation table, the memory management unit translating a virtual address into a corresponding physical address according to the translation table;
a set register for storing at least the base subaddress of the set of registers; and
a buffer register that is inaccessible to the user program, the buffer register being different than the translation look-aside buffer of the memory management unit; and
a central processing unit, the address processing block being coupled between the central processing unit and the address and data buses, the central processing unit executing a user program in user mode, the user program including first and second dedicated instructions that are instructions dedicated to directly programming the DMA controller,
wherein in response to the first dedicated instruction of the user program that includes an address argument indicating a virtual address corresponding to the physical address to be stored in the source or destination register of the DMA controller, the central processing unit supplies the virtual address indicated by the address argument of the first dedicated instruction to the memory management unit, the memory management unit translates the received virtual address into the corresponding physical address according to the translation table, and the buffer register of the address processing block stores the corresponding physical address resulting from the translation by the memory management unit,
in response to the second dedicated instruction of the user program that includes an address argument indicating the virtual address corresponding to the physical address to be stored in the source or destination register of the DMA controller:
the address processing block applies a first word that includes at least high-order bits indicating the base subaddress of the set of registers that is stored in the set register to the address bus, and applies to the data bus the corresponding physical address stored in the buffer register of the address processing block, and
in response to the first word being applied to the address bus, the DMA controller selects the source or destination register and stores the corresponding physical address applied to the data bus in the selected register, and
the second dedicated instruction is different than and after the first dedicated instruction.

10. The system on a chip according to claim 9, wherein each of the registers of the set of registers of the DMA controller has a physical address encoded on a number N of bits made up of the high-order bits indicating the base subaddress of the set of registers followed by bits defining an offset in the set.

11. The system on a chip according to claim 9,
wherein the first dedicated instruction also includes a data argument indicating a size,
in response to the first dedicated instruction, the address processing block applies to the data bus the data argument and to the address bus a second word including the high-order bits indicating the base subaddress of the set of registers that is stored in the set register, and
the DMA controller selects the size register as a function of the second word applied to the address bus and stores in the size register the data argument applied to the data bus.

12. The system on a chip according to claim 9,
wherein in response to a third dedicated instruction dedicated to DMA controller programming received by the central processing unit, the address processing block applies to the address bus a third word including the high-order bits indicating the base subaddress of the set of registers, the set of registers of the DMA controller also includes a status register, and the DMA controller, in response to the third word being applied to the address bus, selects the status register and applies content of the status register to the data bus.

13. The system on a chip according to claim 12, wherein the address processing block determines, from the first dedicated instruction, a first identifier of the user program from which the first dedicated instruction originates, and determines, from at least one of the second and third dedicated instructions, a second identifier of the user program from which the second or third dedicated instruction originates, the address processing block compares the first and second identifiers, in response to the second dedicated instruction, the address processing block applies the physical address stored in the buffer register to the data bus and the first word to the address bus, only if the first and second identifiers match, and in response to the third dedicated instruction, the address processing block applies the third word to the address bus only if the first and second identifiers match.

14. The system on a chip according to claim 13, wherein each of the identifiers of the user program is an address space identifier stored in the translation table of the memory management unit for each user program of the system on a chip, and is delivered during a translation operation of the memory management unit.

15. The system on a chip according to claim 13, wherein each word applied by the address processing block to the address bus also includes the identifier that is determined from the instruction, and the DMA controller selects a register as a function of the identifier in the word that is applied to the address bus.

16. The system on a chip according to claim 9, wherein the DMA controller further includes a state machine for, when the first word is applied to the address bus, selecting the source or destination register of the DMA controller as a function of a current state of the state machine in an ordered cycle.

17. An electronic device comprising at least one system on a chip according to claim 9.

18. A system on a chip comprising:

a central processing unit executing a user program in user mode, the user program including first and second dedicated instructions that are instructions dedicated to directly programming the DMA controller;

a DMA controller that includes at least one set of registers having a base subaddress that is used to address registers of the set of registers, the registers of the set of registers including a source register, a destination register, and a size register;

an address bus coupled to the DMA controller;

a data bus coupled to the DMA controller;

an address processing unit coupled between the central processing unit and the address and data buses;

first means for, in response to the first dedicated instruction of the user program that includes an address argument indicating a virtual address corresponding to the physical address to be stored in the source or destination register of the DMA controller, translating the virtual address into the corresponding physical address according to a translation table, and storing the corresponding physical address in a buffer register of the address processing unit that cannot be accessed by the user program; and second means for, in response to the second dedicated instruction of the user program that includes an address argument indicating the virtual address corresponding to the physical address to be stored in the source or destination register of the DMA controller, applying the corresponding physical address stored in the buffer register of the address processing unit to the data bus and a first word that includes at least high-order bits indicating the base subaddress of the set of registers to the address bus, wherein in response to the first word being applied to the address bus, the DMA controller selects the source or destination register of the DMA controller and stores the corresponding physical address applied to the data bus in the selected register, and the second dedicated instruction is different than and after the first dedicated instruction.

19. The system on a chip according to claim 18, wherein each of the registers of the set of registers of the DMA controller has a physical address encoded on a number N of bits made up of the high-order bits indicating the base subaddress of the set of registers followed by bits defining an offset in the set.

20. The system on a chip according to claim 18, wherein the first dedicated instruction also includes a data argument indicating a size, the system on a chip further comprises fourth means for, in response to the first dedicated instruction, applying the data argument to the data bus and a second word including the high-order bits indicating the base subaddress of the set of registers to the address bus, and the DMA controller selects the size register as a function of the second word applied to the address bus in response to the first dedicated instruction, and stores the data argument applied to the data bus in the size register.

21. The system on a chip according to claim 18, wherein the set of registers of the DMA controller also includes at least one status register, the system on a chip further comprises fourth means for, in response to a third dedicated instruction of the user program, applying a third word including the high-order bits indicating the base subaddress of the set of registers to the address bus, and the DMA controller selects the status register in response to the third word being applied to the address bus, and applies content of the status register to the data bus.

22. The system on a chip according to claim 18, wherein the DMA controller further includes a state machine for, when the first word is applied to the address bus, selecting the source or destination register of the DMA controller as a function of a current state of the state machine in an ordered cycle.

23. The method according to claim 1, wherein the memory management unit includes a translation look-aside buffer comprising the translation table, and the buffer register of the address processing unit in which the corresponding physical address is stored is different than the translation look-aside buffer of the memory management unit.

\* \* \* \* \*